March 26, 1963   C. B. SCHUDER   3,082,782
PNEUMATIC VALVE POSITIONER

Filed Aug. 1, 1960   2 Sheets-Sheet 1

INVENTOR:
Charles B. Schuder,

BY   Bair, Freeman & Molinare

ATTORNEYS.

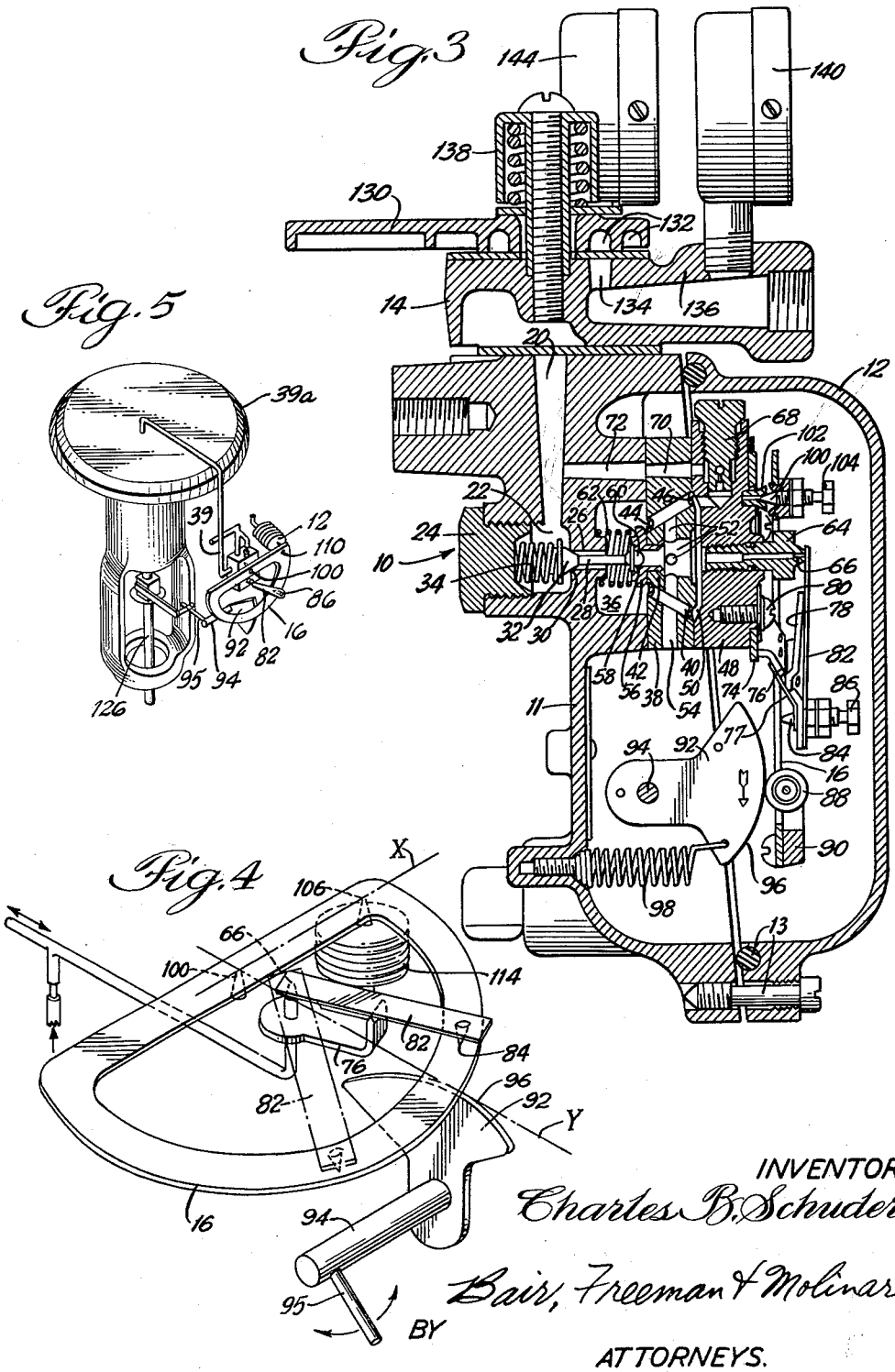

United States Patent Office 3,082,782
Patented Mar. 26, 1963

3,082,782
PNEUMATIC VALVE POSITIONER
Charles B. Schuder, Marshalltown, Iowa, assignor to Fisher Governor Company, Marshalltown, Iowa, a corporation of Iowa
Filed Aug. 1, 1960, Ser. No. 46,706
4 Claims. (Cl. 137—85)

This invention relates generally to improvements in pneumatic valve positioners, and more particularly to a novel suspension system for motion balanced operation of the nozzle-flapper assembly of a pneumatic valve positioner.

Although pneumatic valve positioners have been known which employ a movable beam member of generally circular arc which is responsive to simultaneous and opposed changes in input and feedback potential effects, such prior structures have been characterized by suspension and fulcrum systems which are force balanced. The need has arisen for the improvement of such prior known constructions to achieve greater stability and more consistent dynamic characteristics, while enabling a full range of adjustment of valve stroke length.

It is a primary object of this invention, therefore, to provide a pneumatic valve positioner having a novel arrangement of the components of a nozzle-flapper and suspended beam system which achieves improved and more consistent performance.

It is another object of this invention to provide a pneumatic valve positioner of the type having a nozzle-flapper assembly and a movably mounted beam for varying the clearance between the nozzle and flapper to correspondingly change a control pressure for valve stroking, wherein the beam is supported upon three points for rotation about an input axis and a feedback axis.

It is a further object of this invention to provide a penumatic valve positioner comprising a semi-circular beam supported at three points so that input motion produces beam rotation about a radial input axis and feedback motion produces rotation about a diametric feedback axis at right angles to the input axis, thereby to provide a motion balanced system.

It it another object of this invention to provide an improved pneumatic valve positioner construction wherein the open loop gain change of the device is smaller than the feedback change alone, thereby to provide improved stability of the system at short main valve strokes and to provide more consistent dynamic characteristics over the full main valve stroke range.

It is still another object of this invention to provide a nozzle-flapper assembly and a movable beam of circular arc., wherein the pick-off point between the beam and flapper may be adjustably positioned along a length of arc over a range from zero to maximum valve stroke, and wherein adjustment range of the flapper may be moved to an adjacent length of arc to reverse the input action while maintaining the feedback action so as to reverse the operation of the positioner.

FIGURE 3 is a vertical cross sectional view taken substantially as indicated along the line 3—3 on FIGURE 1;

FIGURE 4 is a fragmentary schematic view illustrating the 3-point suspension and axes of rotation of the movable beam for the nozzle-flapper assembly.

FIGURE 5 is a schematic perspective view illustrating the relationship of the positioner to a valve actuator.

Figure 1:
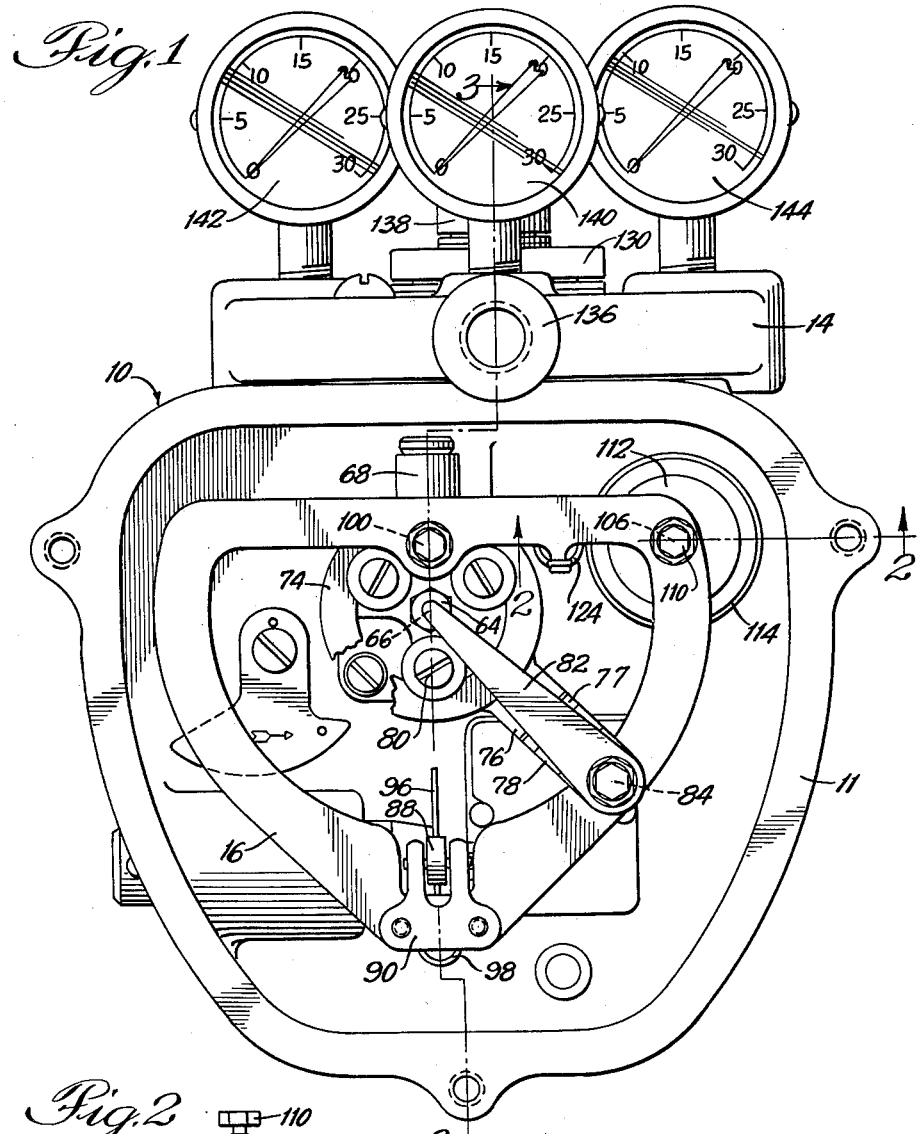
FIGURE 1 is an elevational view of a pneumatic valve positioner constructed in accordance with the present invention, with the casing cover removed to show internal working parts.
Figure 2:
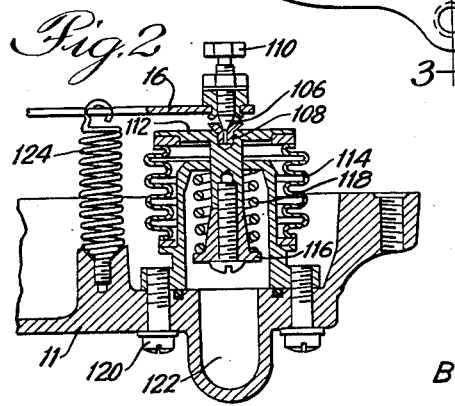
FIGURE 2 is a fragmentary horizontal cross sectional view taken substantially as indicated along the line 2—2 on FIGURE 1.

Referring now more particularly to the drawing, FIGURES 1 and 2 illustrate the constructional details of a pneumatic valve positioner embodying the principles and features of the present invention. The entire positioner unit is designated generally by the numeral 10, and comprises a casing 11 having a cover 12 upon which the by-pass manifold 14 is mounted. Sealing gasket and assembly bolt means 13 secure the cover 12 to the casing 11. A novel semi-circular beam suspension system 16 of a nozzle-flapper assembly is mounted within the casing 11, and constitutes the structure of principal importance contributed by the present invention, as will hereinafter be described in detail.

As best seen in FIGURE 3 of the drawing, the casing 11 provides a supply pressure inlet passage 20 which communicates with an internal chamber 22 laterally opening through the casing 11 and threaded to receive a closure plug 24. The inner flow passage 26 extends from the chamber 22 and receives an inner valve member 28 of a relay assembly therethrough. The passage 26 defines a supply port 30 at the chamber 22 which is adapted to be closed by a first valve head 32 of the member 28. An inner valve spring 34 normally urges the first valve head 32 of the closure of the supply port 30.

The inner flow passage 26 terminates inwardly at chamber 36 which is laterally open and adapted to be closed by a disc 38. The chamber 36 communicates through a suitable passage means, such as the conduit 39, with a diaphragm motor valve or the like, illustrated by the construction 39a in FIGURE 5, in association with which the positioner of the present invention is to be used. A frusto-conical opening 40 is provided centrally of the disc 38 and receives a frusto-conical actuating member 42 in spaced relation therein. The actuating member 42 is movably suspended within the opening 40 by means of a pair of resilient diaphragms 44 and 46. An orifice assembly plate 48 is fixedly assembled with the disc 38 and the casing 11. A volume clearance space 50 is provided between the disc 38 and the plate 48 for freedom of movement of the actuating member 42 with its diaphragm 46.

The actuating member 42 is provided with an axial throughbore and connecting radial bores, collectively indicated at 52. A bore 54 is provided in the closure disc 38 to communicate pressure from the passages 52 and opening 40 to atmospheric pressure within the casing 11.

A valve seat member 56 is carried by the actuating member 42 and serves to define an exhaust port 58 communicating the passages 52 and the chamber 36. A second valve head 60 of the inner valve member 28 cooperates with the exhaust port 58 for closure thereof. A relay spring 62 is disposed between the casing 11 and the valve seat member 56, and serves to normally urge the actuating member 42 toward the right as seen in FIGURE 3 for opening the exhaust port 588.

A nozzle plug 64 is threadedly received in a bore of the plate 48, and serves to define an orifice 66 at its outward end. A primary restriction plug 68 is also threadedly received in a bore of the plate 48, and serves to provide a restricted flow passage between the clearance space 50, and through the passages 70 and 72 of the disc 38 and casing 11, respectively, to the supply pressure inlet passage 20. In this way, the clearance space 50 is in restricted flow communication with the supply pressure.

A flexible mounting assembly is provided for the support of a flapper arm adapted to cooperate in well-known manner with the orifice 66. As is well known, changes in the nozzle-flapper clearance serve to change the back pressure within the chamber 50 of the relay assembly, as will be hereinafter described in detail. The output pressure from the chamber 36, when transmitted to a suitable diaphragm motor valve, produces corresponding main valve stroking. The mounting means for the flapper typically comprises a ring 74 having an arm extension 76 and a flapper support arm 78 which are connected by a thin, flexible metal strip 77 to permit relative flexing of the parts. Mounting bolts 80 serve to secure the ring 74 to the plate 48 in a rotatably adjustable manner so that the flapper assembly may be fixedly positioned in any predetermined position along the full semi-circular circumference of the beam 16.

A flapper 82 is carried by the arm extension 76 by means providing a pick-off point 84 which contactingly engages the beam 16. Adjusting screw means 86 permit the length of the pick-off point means 84 to be adjustably varied for selection of the distance between the flapper 82 and the beam 16, and thereby its initial spaced relation with the nozzle 66. It will be evident that as the pick-off point 84 is adjustably moved (either left or right as seen in FIGURE 3) the flapper arm 78 and the ring 74 with its arm extension 76 will flex to accommodate the positioning of parts.

A follower wheel or bearing 88 is supported by means of a holder yoke 90 upon the beam 16. A cam 92 is secured by means of a pin 94 to suitable rotating means (indicated at 95 on FIGURE 4) extending through the casing 11. The cam 92 provides a cam edge 96 of selected curvature to compensate for non-linearity of the mechanical linkage by which the cam 92 is rotated. It will be understood that special contours may be selected for the cam edge 96 to provide a variety of desired characteristics other than linear between the input or instrument pressure and the output or main valve position. A cam spring 98 between the casing 11 and the cam 92 serves to normally urge the cam in a clockwise direction of rotation, as indicated by the arrow thereon.

Fixed pivot point means 100 is carried by the beam 16, and cooperates with a seat member 102 carried by the plate 48. Adjustment screw means 104 permit the distance between the fixed pivot point 100 and the beam 16 to be selectively adjusted.

Referring now to FIGURE 2 of the drawing, a bellows pivot point means 106 is carried by the beam 16, and cooperates with a seat member 108. Adjustment screw means 110 are provided for selective positioning of the pivot point 106. The seat 108 is carried by the head plate 112 of a bellows assembly 114. A spring seat 116 secured to the head plate 112 supports a biasing spring 118 which normally urges the bellows and its head plate 112 downwardly as seen in FIGURE 2. Assembly bolts 120 secure the parts to the casing 11. Bellows 114 is in internal communication with passage means 122 which communicates with a by-pass manifold assembly 14 to receive an input pressure signal. A coil spring 124 between the beam 16 and the casing 11 normally urges the pivot point 106 onto its seat 108.

The by-pass manifold assembly 14, best seen in FIGURE 3, provides a by-pass valve plate 130 having a plurality of selection channels 132 adapted to communicate with passage 134 of air fitting 136 and with other passages not shown. Spring-biased hold-down means 138 serves to maintain the channels 132 in flow-tight relation with the passage 134. A plurality of pressure gauges are carried by the manifold assembly 14, and include a diaphragm pressure gauge 140, a supply pressure gauge 142, and an instrument pressure gauge 144. The respective gauges communicate through suitable passages, in well-known manner and not shown, with the various corresponding operating pressure passages and chambers for which they serve to sense pressure.

*Practical Operation*

The unique structural arrangement of the present invention, and the novel mode of operation made possible thereby, is best summarized in simplified form by means of the schematic showing of FIGURES 4 and 5 of the drawings. The beam 16 is supported at three points by means of the fixed pivot point 100, the bellows pivot point 106, and the cam 92. The points 100 and 106 lie upon a diametric feedback axis X about which the beam 16 is adapted to rotate. The fixed pivot point 100 and the cam edge 96 lie upon a radial input axis Y, about which the beam 16 is also adapted to rotate. It will be evident that variations in input pressure to the bellows 114 will serve to produce beam rotation about the input axis Y upon the pivot point 100 and the cam edge 96. Cam or feedback motion, however, produces rotation of the beam 16 about the feedback axis X and upon points 100 and 106. The two axes X and Y intersect each other at right angles.

The flapper 82 is moved with respect to the nozzle 66 by rotational movement of the beam 16 about its two axes. The extent to which such beam movement is translated to the flapper 82, and thereby the degree of variation of spacing between the flapper 82 and the nozzle 66, is predetermined by the location of the pick-off point 84 of the flapper assembly. It is an important feature of the invention, in coordinated relation with the three-point suspension of the beam 16, to provide rotational adjustment of the pick-off point between the axes X and Y along the full 90° quadrant therebetween. Such predetermined adjustment of the position of the flapper pick-off point 84 enables the length of the main valve stroke being controlled by the positioner to be smoothly adjusted from zero to a maximum. It will be apparent that when the pick-off point 84 is directly over the cam edge 96 upon input axis Y, the main valve stroke length is zero. When the pick-off point 84 is directly over the feedback axis X, a maximum length of main valve stroke is obtained.

The motion of the input bellows 114 changes the nozzle-flapper clearance, which in turn changes the back pressure against the relay assembly. The output pressure from the relay assembly in turn, produces main valve stroking until the resulting feedback cam rotation restores the nozzle-flapper clearance to near its original value. Such overall regulatory operation is similar to many prior known pneumatic control devices, but the motion-balanced 3-point suspension system for a semi-circular beam as disclosed herein achieves such operation in a markedly improved manner.

It will be evident that relative closing of the nozzle 66 by the flapper 82 will serve to transmit a pressure increase to the diaphragm 46 for movement of the actuating member 42 toward the left as seen in FIGURE 3. Such movement will cause the exhaust port 58 to be closed by the valve head 60 while opening the supply port 30 as its valve head 32 is carried against the inner valve spring 34. Inlet pressure will then be permitted to flow from the passage 20, and through the passage 26, to chamber 36, where it will build up and act against the diaphragm 44 to move the actuating member 42 back again toward the right. If the actuating member 42 is caused to move sufficiently far to the right, the spring 34 will cause the valve head 32 to close the supply 30, and the valve head 60 will be left behind so as to open the exhaust port 58 and permit the inlet pressure captured within the chamber 36 to exhaust to atmosphere through the bores 52 and 54.

In the meantime the pressure in conduit 39 is applied to one side of a diaphragm, for example, in the construction 39a to shift the position of an arm 126 which is connected to a valve structure. As the arm 126 shifts in response to the change in pressure, it shifts the position of the arm 95 to rotate the pin 94 for changing the position of cam 92 accordingly. This serves to reposition the beam 16.

Since selective movement of the pick-off point 84 results in simultaneous but opposite changes in the relative input and feed-back potential effects, the open loop gain change of the control system is smaller than would be the case with a direct feedback change alone. This characteristic operation serves to improve stability of the valve system at relatively short main valve strokes, and provides more consistent dynamic characteristics over the full stroke range.

It will be apparent that movement of the pick-off point 84 to the adjacent quadrant for adjusted positioning (as indicated in dotted line on FIGURE 4) will serve to reverse the effect of the input action while permitting the feedback action to remain the same. In this way, the operation of the positioner can be reversed.

Thus an input or instrument pressure signal applied to the bellows 114 will pivot the beam 16 about the input axis Y. As the beam pivots it rotates the fixed point 84 about the axis Y and if 84 is positioned on the axis Y or adjacent thereto its movement with respect to the axis is extremely limited. On the other hand, if it is positioned adjacent axis X, a large rotational movement about axis Y takes place. As the point 84 pivots it moves the flapper to change the pressure at orifice 66.

With the change in pressure at orifice 66, the diaphragm 46 responds accordingly and the supply pressure in passage 20 is transmitted through the passageway 36. As this supply pressure moves through the passageway 36, it controls the aforementioned motor. This motor may comprise or control a diaphragm, for example, of any well known type actuated in response to the supply pressure and which may be biased by a spring. As the diaphragm is actuated in response to the supply pressure, it in turn controls the position of a valve through a stem. The valve may thus be moved in response to a particular instrument signal, and as the stem moves, a mechanical linkage, for example, associated with the stem controls the shaft or pin 95 in any well known manner to shift the cam edge 96.

As the cam edge 96 rotates in either one direction or another, it changes its position with respect to the beam 96. Thus, the cam edge 96 may rotate the beam 16 about axis X to in turn adjust the position of the flapper with respect to orifice 66.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A motion balanced suspension system for a nozzle-flapper assembly, comprising an arcuate beam supported upon a first pivot point movable relative to the plane of said arcuate beam by means responsive to a variable input signal, a second pivot point fixed relative to the plane of said arcuate beam and defining with said first pivot point a feedback axis of rotation for said arcuate beam, and a third pivot point movable relative to the plane of said arcuate beam by feedback means responsive to a variable output condition and defining with said second pivot point an input axis of rotation for said arcuate beam, said three pivot points being disposed along said arcuate beam so as to orient said feedback and input axes at right angles; flapper means movable by said arcuate beam, said flapper means being adjustably supported for movement along a circumferential quadrant defined between said feedback and input axes, and nozzle means having a clearance with said flapper means varied in accordance with movement of said arcuate beam.

2. A motion balanced suspension system for a nozzle-flapper assembly, comprising a semi-circular beam supported upon a first pivot point adjacent one end of the diameter of said beam and movable relative to the plane thereof by means responsive to a variable input signal, a second pivot point intermediate the ends of the diameter of said beam and fixed relative to the plane thereof to define with said first pivot point a diametric feedback axis of rotation for said beam, and a third pivot point along the circumference of said beam and movable relative to the plane thereof by feedback means responsive to a variable output condition and defining with said second pivot point an input axis of rotation for said beam at right angles to said feedback axis, said feedback means comprising a movable cam operatively engaging said beam; flapper means movable by said beam, and nozzle means having a clearance with said flapper means varied in accordance with movement of said beam.

3. A motion balanced suspension system for a nozzle-flapper assembly, comprising a semi-circular beam supported upon a first pivot point at one end of the diameter of said beam and movable relative to the plane thereof by means responsive to a variable input signal, a second pivot point at the diametric center of said beam and fixed relative to the plane thereof to define with said first pivot point a diametric feedback axis of rotation for said beam, and a third pivot point at the mid-circumference of said beam and movable relative to the plane thereof by feedback means responsive to a variable output condition and defining with said second pivot point an input axis of rotation for said beam; flapper means movable by said beam by engagement therebetween at a pick-off point, said pick-off point being adjustably movable along the circumferential quadrant between said axes, and nozzle means having a clearance with said flapper means varied in accordance with movement of said beam.

4. In a pneumatic valve positioner of the type having nozzle-flapper means for controlling a relay output, a three-point motion balanced suspension system for the nozzle-flapper assembly, comprising an arcuate beam supported upon a first pivot point movable relative to the plane of said arcuate beam by means responsive to a variable input signal, a second pivot point fixed relative to the plane of said arcuate beam, said first and second pivot points being disposed along the diameter of said beam to define a diametric feedback axis of rotation for said arcuate beam, and a third pivot point movable relative to the plane of said beam by feedback means responsive to a variable output condition, said second and third pivot points being disposed on a radius at right angles to said feedback axis to define a radial input axis of rotation for said beam; flapper means movable by said beam by engagement therebetween at a pick-off point being adjustably movable along a circumferential quadrant between said axes, and nozzle means having a clearance with said flapper means varied in accordance with movement of said beam.

References Cited in the file of this patent

UNITED STATES PATENTS

| | | |
|---|---|---|
| 2,177,908 | Muselier | Oct. 31, 1939 |
| 2,585,347 | Robins | Feb. 12, 1952 |
| 2,736,199 | Ibbott | Feb. 28, 1956 |
| 2,742,917 | Bowditch | Apr. 24, 1956 |
| 2,960,098 | Watrous | Nov. 15, 1960 |
| 3,047,002 | Jaquith | July 31, 1962 |

OTHER REFERENCES

Bulletin No. 98,278; Sept. 1958 edition; Taylor Instrument Co.